United States Patent

Ta

Patent Number: 6,056,201
Date of Patent: May 2, 2000

[54] WATER TEMPERATURE DETECTING AND CONTROLLING DEVICE

[76] Inventor: Su Chao Ta, No. 203, Jiin Shan Li, Kuan Shi Town, Hsin Chu Hsien, Taiwan

[21] Appl. No.: 09/168,102

[22] Filed: Oct. 8, 1998

[51] Int. Cl.⁷ .................................................. G05D 23/13
[52] U.S. Cl. ................................. 236/12.12; 251/129.03; 137/625.4
[58] Field of Search ............................. 236/12.12, 12.11; 251/129.03; 137/625.4

[56] References Cited

U.S. PATENT DOCUMENTS

| | | | |
|---|---|---|---|
| 3,417,637 | 12/1968 | Vanderbilt | 251/129.03 X |
| 3,721,386 | 3/1973 | Brick et al. | 236/12.12 |
| 4,842,191 | 6/1989 | Bergmann | 251/129.03 X |

Primary Examiner—William Wayner
Attorney, Agent, or Firm—Bacon & Thomas

[57] ABSTRACT

A water temperature detecting and controlling device may be controlled automatically or manually so as to regulate the ratio of the cold to hot water in a prior faucet, so that the temperature of the water flowing out of the faucet may be controlled. The structure of the device is comprised primarily of a motor with a shaft which is fixedly engaged to the flow by-pass rod of the water mixing structure, while said motor is received within a rotary head which is fixedly screwed to a flow by-pass rod; therefore, the rotary head may be rotated by hand to drive the motor and the flow by-pass rod or to provide a water flow to drive the motor to rotate and then further to drive the flow by-pass rod to rotate, this similarly achieves the effect of distributing the cold and hot water. Additonally, the rotation of the motor is controlled by a microprocessor. Accorded to the set and detecting data, the microprocessor may change the rotation direction and angle of motor, and detect the usage of the water by a water flow detecting circuit so as to adjust a power-saving mode which may be used.

4 Claims, 4 Drawing Sheets

WATER TEMPERATURE DETECTING AND CONTROLLING DEVICE

FIELD OF THE INVENTION

The present invention is related to a water temperature regulating device, especially to a water temperature detecting and controlling device by which cold and hot water temperatures may be controlled automatically or manually so that water temperature is regulated.

DESCRIPTION OF THE PRIOR ART

In prior faucet having cold and hot water temperature regulation, the inner structure thereof is comprised of three water tubes, wherein two tubes are supplied with hot and cold water, and another tube is utilized for providing mixed hot and cold water. Other prior faucets are controlled manually, and may be classified as two types: one having a control valve, and the other without a control valve, where the control method without a control valve utilizes two rotating switches for the cold and hot water, which are regulated for adjusting the cold and hot water flow and controlling the water temperature. With respect to the control method utilized by the faucet having a control valve, a control valve is installed between the three water tubes by a by-pass rod to regulate the angle position of the control valve. In this way, the cold and hot water flows will be determined according to the angle position of the control valve so that the water temperature is regulated.

Additionally, in Taiwan Patent Application No. 305458, a water temperature automatic control device is provided, which includes a temperature sensor, a temperature controller, and a control device. The control device includes a motor, a limited switch board, a turning rod, a fixing plate, and a housing, wherein the spindle of the motor penetrates through said limited switch board, the turning rod, and the fixing plate and then engages a mixing water control rod. In practice, the temperature controller compares the set temperature with the temperature sensed by the sensor, so as to induce a current to drive the motor's rotations, whereby, the mixing water control rod will be rotated so that the ratio of cold and hot water is regulated automatically. The limited switch board will limit the rotating angle of the motor's spindle with the turning rod so that as the spindle is limited to the two end-switch of the limited switch plate, the motor will stop rotating.

However, in practice, the structure of the aforementioned patent application is more complex and has several design defects. That is, as the spindle of the motor rotates to the two ends of the limited switch plate, the rotating spindle is forcedly stopped by the end-switch on the limited switch plate and the stop portion of the turning rod. Therefore, it is possible that the motor will be harmed, thus affecting the lifetime thereof. Additionally, the end-switch on the limited switch plate and the stop portion of the turning rod will suffer serions wear. Moreover, said patent application provides only the electric control method instead of a manual control method. Other than causing inconvenience in daily life, if the motor is destroyed or the power source is interrupted, and no manual control has been provided, normal usage of the faucet may not be maintained. Also, because the water temperature control device is separated from the faucet, when the faucet is opened, the control and display functions are not actuated. Another, seperate switch is necessary to turn on the cantrol and display device. This constitutes an operational defect.

Accordingly, there are many drawbacks in the prior design, and it is necessary that they to be further improved.

OBJECTIVE OF THE PRESENT INVENTION

In summary, all of the prior temperature control faucets have practical disadvantages. The present invention, however provides a novel faucet structure for detecting and controlling water temperature.

An objective of the present invention is to provide a water temperature detecting and controlling device which includes all of the advantages in the prior art and meanwhile utilizing both manual and automatic operation so that the user may select the desired manner of operation, and thus avoid problem caused by power failure or motor failure.

A further objective of the present invention is to provide a device which electrically, automatically controls water temperature. The water temperature of the mixed of cold and hot water is continuously compared with the water temperature set by the user through a microprocessor, and then, through the use of a motor, the control valve between the cold and hot water tubes is regulated to change the ratio of the contact areas between the control valve and the openings of the cold and hot water tube, thus the ratio of cold to hot water is affected and water temperature is changed. While the control valve is rotated to an extreme position, the motor current will increase so that the motor control circuit will detect this condition and will stop its rotation. Therefore, power consumption and the wear on the mechanic components are decreased thus prolong the lifetime of the device.

Another further objective of the present invention is to provide a water temperature detecting and controlling device having a power-saving function. The outlet thereof is installed with a water flow detecting means. When no water flows form the ontlet, most of the power will be shut off and the device will enter a standby condition.

SUMMARY OF THE INVENTION

A water temperature detecting and controlling device comprised of a water temperature sensing and controlling means, and a water flow regulating means. Said water temperature sensing and controlling means may be installed inside or outside of the regulating means and is mainly comprised of a microprocessor, a quartz oscillating circuit, a system reset circuit, a switch detecting circuit, a power source circuit, a water flow detecting circuit, a forward rotary control circuit, a backward rotary control circuit, a voltage regulating circuit, a constant current power source circuit, a temperature sensor, a signal capturing circuit, a carrier sampling circuit, a signal amplifying circuit, and a displayer, while said water flow regulating means is comprised of a rotary head, a motor, a turntable, a motor fixing plate, and a flow by-pass rod.

As the water outlet is opened, water flows through the water flow detecting circuit of the water temperature sensing and controlling means, thus the water temperature sensing and controlling means is restored to the normal condition from a standby condition, while the microprocessor compares the temperature set by a switeh by a user and a current water temperature sensed by the temperature sensor. If the two temperatures are diffevent, then the device will decide whether the ratio of the cold to hot water must be changed, and will enable the forward rotary control circuit or the backward rotary control circuit to drive the motor within the water flow regulating means to rotate. In this way, the flow by-pass rod is engaged with the spindle of the motor and will and be rotated. Becanse the flow by-pass rod is engaged with a control valve, as the motor is rotated, the control valve may be driven to rotate, and as a consequence thereof, the ratio of cold to hot water will be regulated. Further, as the rotary head and the turntable are locked with a screw, the rotary head may be rotated by hand so that the turntable may drive the flow by-pass rod to rotate, divectly adjusting the ratio of cold to hot water.

It is appreciated that the control section of the present invention may be installed within the water mixing structure of a faucet or a nozzle, and as water flows through the outlet, said function will be performed.

BRIEF DESCRIPTION OF THE DRAWINGS

The present invention will be better understood and its numerous objectives and advantages will become apparent to those skilled in the art by referencing the following drawings in which.

DESCRIPTION OF THE PREFERRED EMBODIMENT

Figure 1:
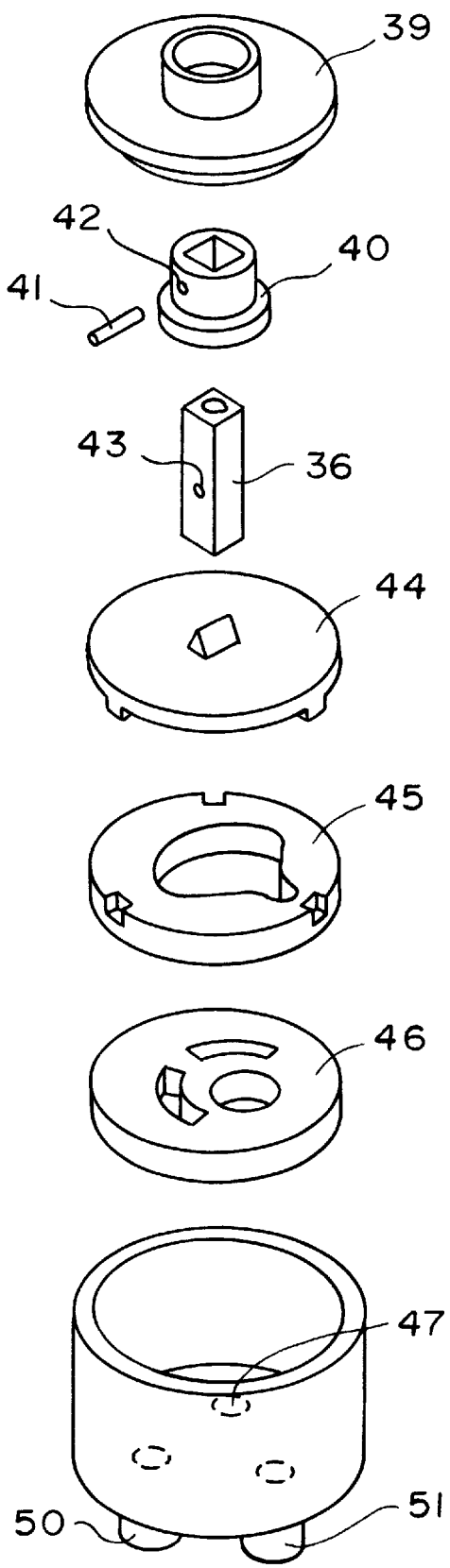
FIG. 1 shows a water mixing structure of the prior faucet.

Referring to FIG. 1, a prior water mixing structure 38 of a faucet is shown, which comprises a flow by-pass rod 36, an upper cover 39, a fixing joint 40, a seat 44, a control valve 45 and a water mixing regulating disk 46. The flow by-pass rod 36 is formed of a pin 41 penetrating the round holes 42 and 43 so as to combine with the fixing joint 40, and then an upper cover 39 is used to tightly compress the combining piece so that the seat 44, the control valve 45 and the water mixing regulating disk 46 tightly adhere together. Thus, when the flow by-pass rod 36 is rotated, the effect of driving the seat 44 and rotating the control valve 45 are achieved. Further as the control valve 45 is rotated, thus the ratio of the water mixed from the cold water tube 47 and the hot water tube 50 may be changed. After the water is mixed, the water will flow out of the tube 51.

Figure 2:
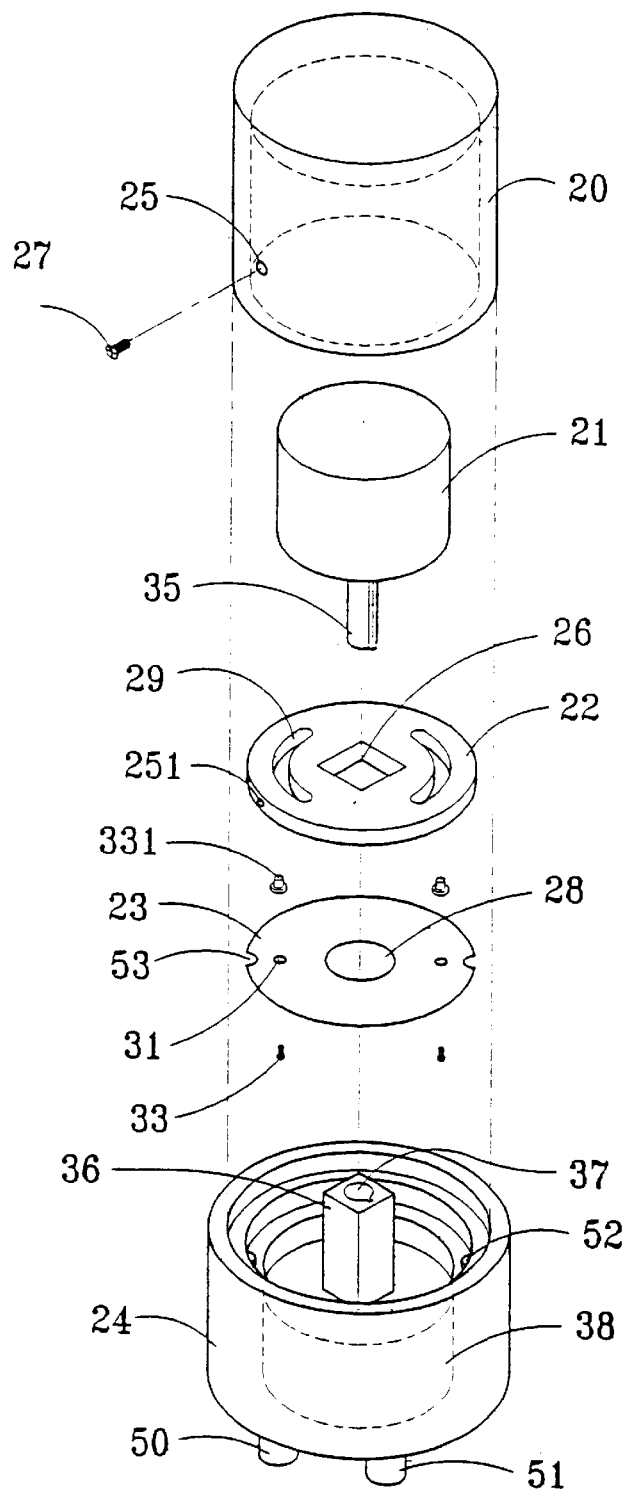
FIG. 2 is an exploded view of the water flow regulating means in the present invention.

The water temperature detecting and controlling device of the present invention is comprisd of a water temperature sensing and controlling means and a water flow regulating means. Referring to FIG. 2 shows the water flow regulating means, which includes a rotary head 20, a motor 21, a turntable 22 and a motor fixing plate 23. The rotary head 20 is manufactured of a hollow cylinder having one end of which is sealed, and the motor 21 is received within the hollow portion of the rotary head 20. The bottom of the rotary head 20 is covered by a turntable 22 and then a screw 27 is turned through the hole 25 and a screw hole 251 so as to fix the rotary head 20 and the turntable 22. Thus, the motor 21 may be located within the rotary head 20, while the spindle 35 of the motor will be engaged with a hole 37 on the flow by-pass rod 36. The flow by-pass rod 36 will pass through the central hole 28 of the motor fixing plate 23 and the rectangular hole 26 of the center of the turntable 22 to combine with the spindle 35. A rectangular hole 26 and a cambered groove 29 are formed on the turntable 22, while central holes 28 and 31 are formed on the motor fixing plate 23 and a groove 53 is formed on the edge thereof. The prior faucet water mixing structure 38 is installed on the hollow portion of the housing 24, and a pillar 52 is installed on the edge of the housing 24. Matched with the groove 53 of the motor fixing plate 23, the motor fixing plate 23 is fixed within the housing 24. The flow by-pass rod 36 penetrates the central hole 28 of the motor fixing plate 23. By a screw 33 penetrating the hole 31, the turntable 22 and the motor fixing plate 23 will lock onto the bushing 331 so that the upper half convex portion of the bushing 331 may engage the cambered groove 29. Thus, the rotation of the turntable 22 may be limited by the bushing 331. The motor 21 is combined with the motor fixing plate 23 by the screw 33 to penetrate hole 31 of the motor fixing plate 23 and then further through the hollow portion of the bushing 331 and the cambered groove 29 of the turntable 22, finally to screw into the a fixing screw hole of the motor 21. This configuration attains the objective of positioning and fixing the motor 21, so that the motor 21 may rotate by the manual adjustment of water flow by use of the handle. This design is conformed to the manual adjustment.

If the cold and hot water are mixed electronically, the spindle 35 of the motor 21 will be driven to rotate. Because the spindle 35 of the motor 21 is engaged with the hole 37 of the flow by-pass rod 36, the flow by-pass rod 36 will be driven to rotate. Further, as the flow by-pass rod 36 is engaged with the rectangular hole 26 of the turntable 22, the turntable 22 will also be driven to rotate. Because the rotation of the turntable 22 is limited by the bushing 331, as it is rotated to the extreme position of the cambered groove 29, the spindle 35 of the motor 21 will stop rotating. Thus, as the turntable 22 is rotated to the extreme position of the cambered groove 29, the control valve 45 shown in FIG. 1 has been rotated to the maximum water flow of the cold or hot water. This can be controlled manually by using the handle(not shown in FIG. 2), which is engaged to the rotary head 20. By the engagement of the rotary head 20 and said handle, the turntable 22 will further be driven to rotate. Because the rectangular hole 26 and the flow by-pass rod 36 are tightly engaged, the flow by-pass rod 36 will also rotate, while the rotation angle thereof is limited by the cambered groove 29.

Figure 3:
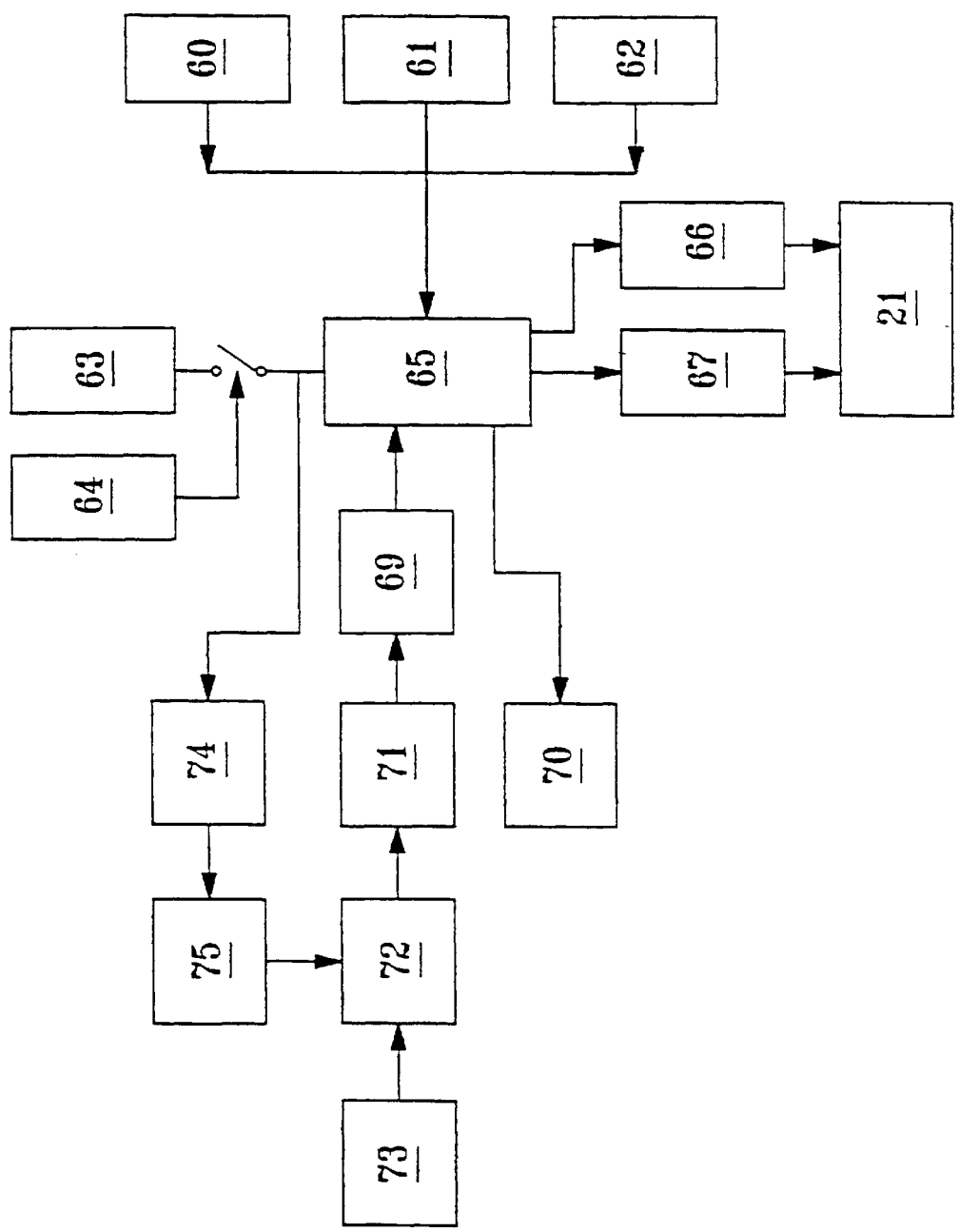
FIG. 3 shows the block diagram of the water temperature sensing and controlling means in the present invention.

FIG. 3 shows the block diagram of the water temperature sensing and controlling means of the present invention. The water temperature sensing and controlling means includes five sections: a power source section, a detecting section, a central possessing section, a display section and a control section. The power source section of the present invention consists of a power source circuit 63, a water flow detecting circuit 61, a voltage regulating circuit 74 and a constant current circuit 75. The power source circuit 63 is used to supply power to the device of the present invention. The water flow detecting circuit 61 is installed on the water outlet and is mainly utilized to detect the water flow. If none, it detects that the water has not been used, and most of the power is cut and the device will revert to standby condition. If there is a water flow, the water flow detecting circuit will sense the same and the power source circuit will supply power to enable all of the functions of the circuits to operate. An IC-7201L is employed by the voltage regulating circuit 74 to supply a steady current of 2.5 V of DC voltage. The constant current circuit 75 provides a steady current for use by the circuits of the detecting section.

The central processing section includes a microprocessor 65, a quartz oscillating circuit 60, a system reset circuit 61 and a switch detecting circuit 62. The microprocessor 65 has three primary functions: (1) receiving a switch signal to record the temperature value set by the user as the parameter value; (2) capturing the temperature signal detecting by the detecting section; and (3) outputting the parameter value or said temperature signal to the display section and outputting a control signal to a control section according to the comparison of the temperature signal detected and the parameter value set. The quartz oscillating circuit 60 includes a 4 Mhz quartz oscillator and steadily provides a frequency to microprocessor 65 and other circuits. While the system reset circuit 61 is used to reset the initial condition of the microprocessor 65, the switch detecting circuit 62 provides the user interface, so that the user may set the temperature value or change the system mode by using a switch (not shown in FIG. 3).

The detecting section includes a temperature sensor 73, a signal capturing circuit 72, a carrier sampling circuit 71 and an amplifying circuit 69. The temperature sensor 73 may be a K-TYPE temperature sensor. The signal capturing circuit 72 is used to capture said resistance variation of said temperature sensor 73, while the carrier sampling circuit 71 is used to digitize and sample the signal obtained from the signal capturing circuit 72 and the digitized and sampled signal is amplified by the amplifying circuit 69 and is further transferred to the microprocessor 65.

The display section includes a liquid crystal display (LCD) and the circuit thereof 70 for displaying the digital signal transferred by the microprocessor 65 on the liquid crystal display. Thus, the current water temperature or the preset temperature may be displayed.

The control section includes a forward rotary control circuit 66 and a backward rotary control circuit 67. When the temperature value captured by the microprocessor 65 from the detecting section is lower than said parameter value, the microprocessor 65 will control an optic coupling TRAIC so as to enable the forward rotary control circuit 66 to function until the current temperature is equal to the parameter value, at which time the forward rotary control circuit 66 will stop the drive. If the detecting temperature is higher than the parameter value, then the microprocessor 65 will control the optic coupler TRAIC so as to enable the backward rotary control circuit 67 to function until the current temperature is equal to the parameter value, at which time the backward rotary control circuit 67 will be stop the drive. Said optic coupler is used by the forward rotary control circuit 66 to control the firing angle of the TRAIC so that the motor may rotate forward. Another optic coupler is used by the backward rotary control circuit 67 to control the firing angle of the TRAIC so that the motor may rotate backward. As the control valve 45 shown in FIG. 2 is rotated to the extreme position, the turntable 22 is also rotated to the extreme position. The current of the motor 21 will then increase. When this is detected, the microprocessor 65 will stop the drive of the forward rotary control circuit 66 or the backward rotary control circuit 67 so that the motor will stop rotating. Thus, the power consumption is decreased and wear on the components is reduced.

Figure 4B:
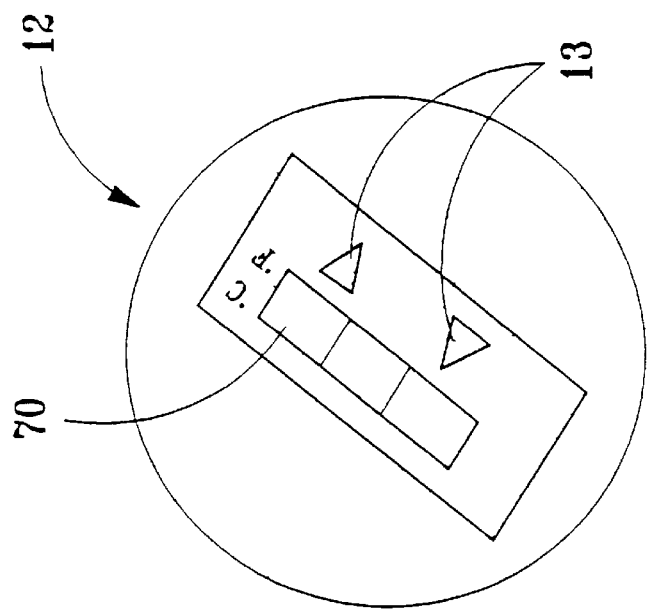
FIG. 4B shows the outer appearance of the display control plate of the embodiment of the present invention as shown in FIG. 4A.
Figure 4A:
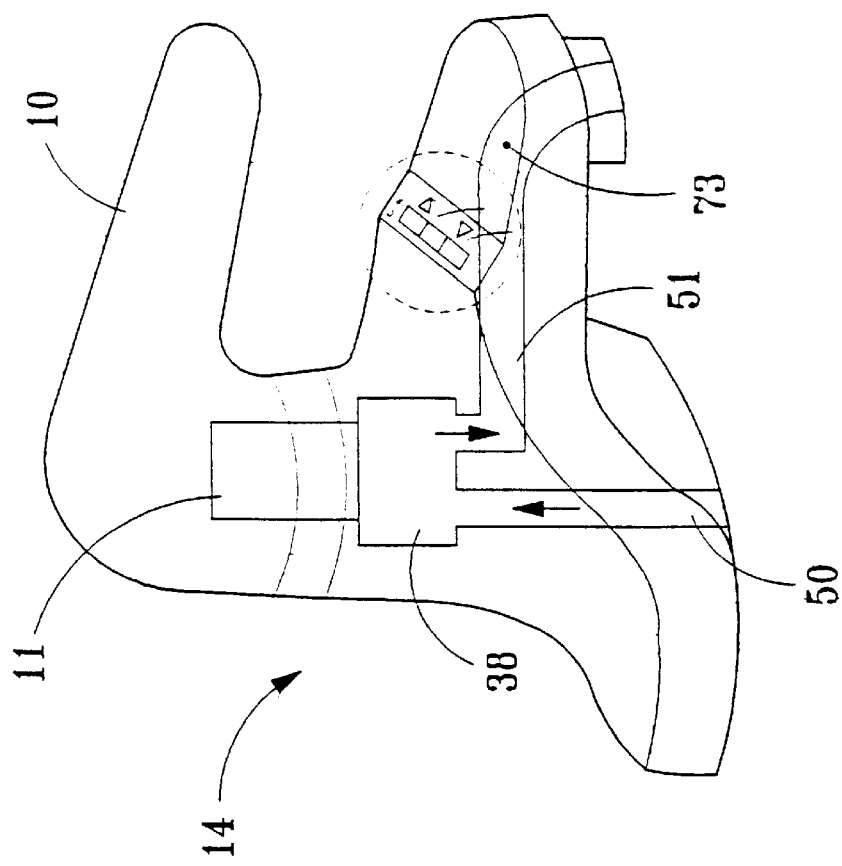
FIG. 4A is a schematic view showing the entire structure of the preferred embodiment of the present invention.

FIG. 4A shows a the structure schematic view of the preferred embodiment of the present invention. The water temperature detecting and controlling device of the present invention may be installed within the faucet 14 wherein the water flow regulating means 11 is combined with a prior water mixing means 38. A control display 12 is located outside of the faucet 14, as shown in FIG. 4B, which includes a liquid crystal display 70 and circuit therefor, and a switch 13. The current water temperature or preset water temperature may be displayed with a centigrade or Fahrenheit indication. The user may input the desired water temperature by switch 13. When the electrical control is activated, the water flow regulating means 11 will be controlled by the water temperature sensing and controlling means shown in FIG. 3 to adjust the water mixing structure 38 of the prior faucet and then to the water temperature. In addition, the handle 10 may be controlled manually, as the rotary head of the water flow regulating means 11 is tightly engaged with the handle 10 to rotate the water mixing structure 38 of the faucet. Thus, the ratio to and flow of the cold and hot water are regulated.

Although a certain preferred embodiment of the present invention has been shown and described in detail, it should be understood that various changes and modifications may be made therein without departing from the scope of the appended claims. For example, the present invention may be combined within the nozzle water mixing structure. Thus, the present invention is defined in the following claim.

What is claimed is:

1. A water temperature detecting and controlling device having a cold and hot water mixing structure and a handle for controlling water flow comprised of:

a water temperature sensing and controlling means; and a water flow regulating means;

wherein said water flow regulating means is operated either automatically or manually to change the water temperature; when the manual control is used, the ratio of cold to hot water may be regulated directly by rotating said handle; when the electrical control is activated, the water temperature sensing and controlling means compares of the temperature set by a user to the detected temperature; if the temperatures are not the same, the water temperature sensing and controlling means will output a signal to drive the motor of said water flow regulating means to regulate the ratio of said cold to hot water, and the water temperature is changed until the set temperature is the same as that detected, then, the water temperature sensing and controlling means will stop the drive of the motor; and wherein said water temperature sensing and controlling means comprises:

a detecting section;

a central processing section;

a display section;

a control section; and a power source section;

wherein when said handle is opened and water flows out, the power source section will enable the operation of all of the functions of all sections; by said detecting section, the central processing section will compare the detected temperature with the set temperature, if the two temperatures are different, the central processing section will drive the motor to rotate, regulating the respective flow of cold and hot water; if the two temperatures are the same, then the motor will be stopped, and the central processing section will display the temperature value on the display section.

2. A water temperature detecting and controlling device having a cold and hot water mixing structure and a handle for controlling water flow, comprised of:

a water temperature sensing and controlling means; and a water flow regulating means;

wherein said water flow regulating means is operated either automatically or manually to change the water temperature; when the manual control is used, the ratio of cold to hot water may be regulated directly by rotating said handle; when the electrical control is activated, the water temperature sensing and controlling means compares of the temperature set by a user to the detected temperature; if the temperature are not the same, the water temperature sensing and controlling means will output a signal to drive the motor of said water flow regulating means to regulate the ratio of said cold to hot water, and the water temperature is changed until the set temperature is the same as that detected, then, the water temperature sensing and controlling means will stop the drive of the motor; and wherein said water flow regulating means is comprised of:
a rotary head formed of a hollow cylinder;
a motor received within the hollow portion of said rotary head;
a turntable having a central hole and a guiding groove;
a motor fixing plate with a central hole and fixed on said water mixing structure; and
a flow by-pass rod installed on said water mixing structure;

wherein said turn table is fixedly engaged to the rotary head and the through holes of said turntable may receive said flow by-pass rod so that as the rotary head is rotated, the flow by-pass rod may be rotated directly; said motor fixing plate is fixed on the motor by a pillar to penetrate the guiding groove of the turntable, and the spindle of the motor will engagedly penetrate the central hole of the turntable and freely penetrate the central hole of the motor fixing plate to engage the flow by-pass rod so that as the spindle of the motor is rotated, the turntable will drive said flow by-pass rod to regulate the cold and hot water.

3. A water temperature detecting and controlling device having a cold and hot water mixing structure, comprising:
a water temperature sensing and controlling means and a water flow regulating means, wherein said water temperature sensing and controlling means is comprised of:
a switch circuit for generating a water temperature setting signal;
a temperature sensor for generating a signal regarding a temperature of the mixed cold and hot water;
a sampling and amplifying circuit for receiving the signal from said temperature sensor and generating a temperature signal by a sampling and amplifying process;

a central process unit for receiving said water temperature setting signal and said temperature signal, and generating a first signal if said setting temperature is higher than the temperature of the mixed water, and generating a second signal if said setting temperature is lower than the temperature of the mixed water; and a motor controlling circuit for receiving said first signal and said second signal, and then generating one driving electric current; and wherein said water flow regulating means is comprised of:
one motor for receiving said driving electric current to enable the spindle thereof to rotate;
a motor fixing plate to be used to fix said motor;
a turntable disposed between said motor and said motor fixing plate for constraining the rotating range of said spindle;
a flow by-pass rod for connecting said spindle to said mixing structure so that the mixing structure can adjust the ratio of cold and hot water when the spindle rotates;

said driving electric current in response to said first signal drives said spindle to rotate, so that the cold and hot water is adjusted to make the mixed water temperature increase; and said driving electric current in response to said second signal drives said spindle to rotate so that the cold and hot water is adjusted to make the mixed water temperature decrease.

4. The water temperature detecting and controlling device as claimed in claim 3, wherein said water temperature sensing and controlling means further includes a displaying device for displaying a digital signal received from said central process unit.

* * * * *